United States Patent [19]

Bonar

[11] Patent Number: 5,005,248
[45] Date of Patent: Apr. 9, 1991

[54] WINDSHIELD WASHER AND WIPER

[76] Inventor: George D. Bonar, G.P.O. Box 2064, New York, N.Y. 10116

[21] Appl. No.: 220,249

[22] Filed: Jul. 18, 1988

[51] Int. Cl.⁵ ............................................. A47L 1/02
[52] U.S. Cl. .............................. 15/250.04; 15/250.41; 15/250.42
[58] Field of Search .......... 15/250.04, 250.41, 250.42, 15/250.03, 103, 121, 245, 250.36, 250.16, 250.05

[56] References Cited

U.S. PATENT DOCUMENTS

| | | | |
|---|---|---|---|
| 1,653,176 | 12/1927 | Herman | 15/250.04 |
| 2,399,652 | 5/1946 | Rappl | 15/250.36 |
| 2,407,215 | 9/1946 | Anderson | 15/250 C |
| 2,893,041 | 7/1959 | Schafer | 15/250.16 |
| 3,034,167 | 5/1962 | O'Donnell | 15/250.36 |
| 3,086,239 | 4/1963 | Peras | 15/250.36 |
| 3,147,505 | 9/1964 | Capasso | 15/250.04 |
| 3,238,555 | 3/1966 | Cels | 15/250.04 |
| 3,378,875 | 4/1968 | Kern | 15/250.04 |
| 3,461,476 | 8/1969 | North | 15/250.04 |
| 4,527,105 | 7/1985 | Shiraishi | 15/250 C X |
| 4,745,653 | 5/1988 | Bliznak | 15/250.04 |

FOREIGN PATENT DOCUMENTS 884220 4/1943 France ............................ 15/250.05

*Primary Examiner*—Frankie L. Stinson
*Attorney, Agent, or Firm*—John B. Dickman, III

[57] ABSTRACT

A windshield wiper for cleaning the windshield of motor vehicles, where a vertically moving wiper blade extends across the width of the windshield. The wiper blade has a generally triangular cross section with concave walls for collecting water and dumping it in front of the blade. There are two cleaning edges; one for cleaning on the downstroke, and one for cleaning on the upstroke. Sensors are placed at desired locations around the periphery of the windshield to sense the moisture when precipitation occurs and are connected in the windshield wiper circuit to activate the wipers accordingly.

8 Claims, 4 Drawing Sheets

WINDSHIELD WASHER AND WIPER

BACKGROUND OF THE INVENTION

Heretofore, motor vehicle windshield wipers were considered to have solved the problem of removing rain, snow, and dirt from windshields. The solution was to use a pair of oscillating blades moving in a fan-like fashion across the windshield. While the blades, in fact, cleared the field of vision of the driver, they did leave areas of the windshield covered, which restricted the viewing area by 20 to 30 percent. Even though 20 to 30 percent does not seem like much, depending on which areas were restricted, a hazardous Condition could exist because of blind areas left by a fan-like wiper pattern.

The oscillating blades are operated by a single motor and linkage which cause the blades to oscillate in the same direction. However, to do this, the pivot points of the wiper arms are arranged to give the greatest cleaning area in front of the driver. The wiper blade on the driver's side is located so that the blade provides a clean area beginning at the side edge, extending the length of the blade, and forming an arc part way across the windshield. The passenger side wiper blade begins a path from the bottom of the windshield through an arc to a point close to the passenger side edge, completing the arc at the bottom of the windshield. The passenger side wiper blade forms a complete arc or fan-like pattern, while the driver side wiper blade only forms a partial arc.

It is obvious that the fan-like pattern does not clean the areas above the pattern or the area closest to the passenger side edge. These are areas which form the 20-30 percent of uncleaned portions of the windshield that could create a hazardous condition. The uncleaned area closest to the passenger side edge is the most hazardous area since it is in the peripheral vision area of the driver blocking or impairing visibility events in that area.

Not until the present invention has there been a windshield wiper which cleans the entire windshield surface. The present wiper eliminates the fan-like pattern of the prior art wiper blades. Further, the blind area closest to the passenger side edge left by the oscillating blade is eliminated.

SUMMARY OF THE INVENTION

The present invention relates to a windshield wiper for cleaning motor vehicle windshields, and in particular, a windshield wiper for removing rain, snow or dirt from an entire windshield.

The present invention also shows the use of moisture sensors to detect the initial moisture when a rainstorm starts and to activate the wipers accordingly when the car motor is running and the ignition is on.

The windshield wiper of this invention extends horizontally across a windshield and makes a sweeping reciprocating movement up and down a windshield. There are at least two cleaning edges on the wiper, one for downward cleaning and the other for upward cleaning. In order to prevent the removed rain, etc. from spilling over the wiper and running down the windshield on the upward cleaning cycle, the wiper is provided with slanted gutters to carry the rain to the side edges of the windshield.

The windshield wiper is operated by a synchronous gear, pulley or combination thereof and a motor. The wiper moves from the bottom to the top of the windshield where it reverses, either by reversing the motor drive or by a continuous loop of a pulley and chain that reaches its top end and starts down.

A gear and a chain drive system with micro switching to reverse direction can also be used to move the windshield wiper up and down the windshield. When the wiper reaches the end of its travel, either up or down, a trip member contacts a microswitch which signals the drive motor to reverse direction.

Alternatively, a series of electromagnets either embedded in the windshield or tape applied to the surface of the windshield move the windshield wiper up and down. There are cooperating magnetic means on the ends of the wiper which are attracted and repulsed by actuation of the desired circuits.

The wiper is made of plastic, rubber or any flexible and stretchable material that can be molded into a double bladed wiper with a reinforced middle portion to provide strength to the wiper when drawn taut across a windshield. The wiper may have several different cross section shapes so long as there are two blades for up and down cleaning.

DESCRIPTION OF THE PRESENT INVENTION

Figure 1:
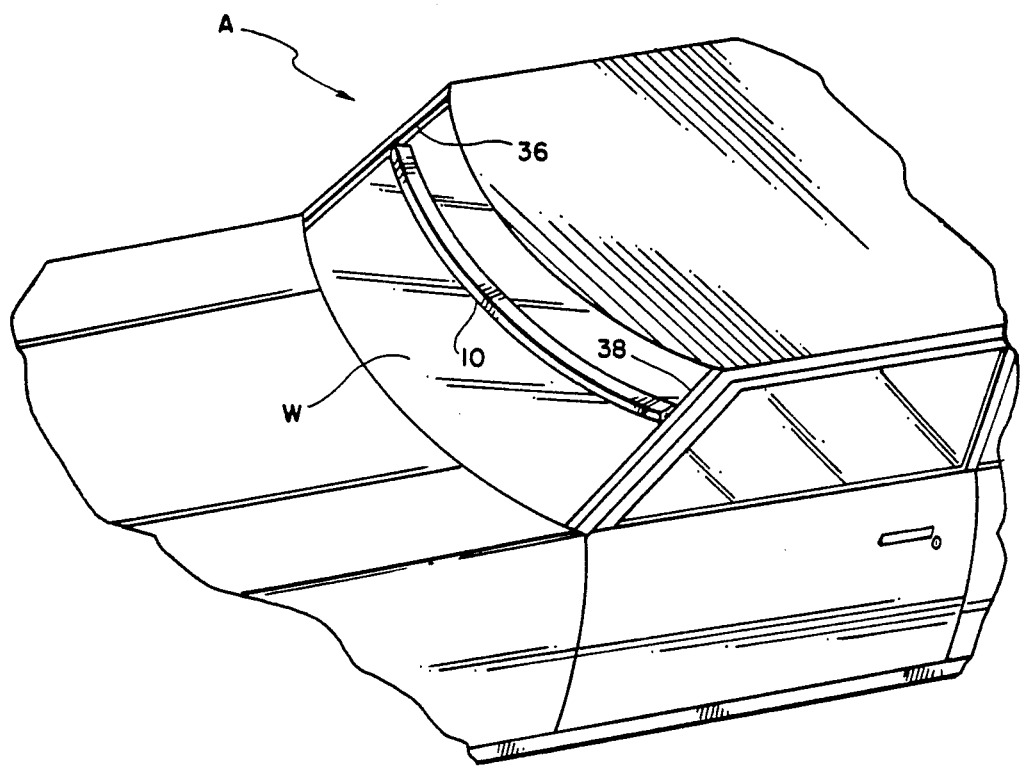
FIG. 1 shows a perspective view of a motor vehicle with a windshield wiper of the present invention.

Referring to the drawings there is shown in FIG. 1 an automobile A, with a windshield W. A windshield wiper 10 moves up and down over the surface of the windshield W. The wiper 10 is stretched horizontally across the windshield W extending from side edge to side edge of the windshield, thereby cleaning the entire surface. Sensors 11 are positioned at specific locations around the periphery of the windshield for a purpose to be later described.

Figure 5:
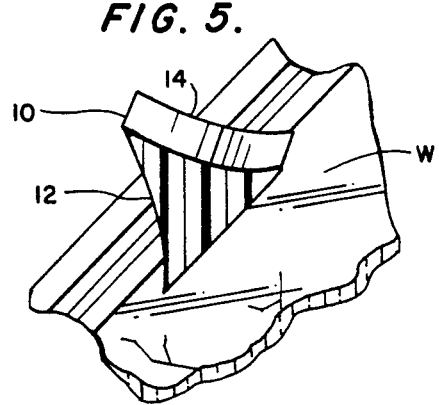
FIG. 5 is a cross sectional view of a windshield wiper of the present invention taken along the line 5—5 of FIG. 2.

FIG. 5 shows a windshield w and a windshield wiper 10 moving up the surface of the windshield. The wiper 10 has a triangular cross section with a pair of concaved sides 12 and 14. Side 12 is the downward side of the wiper, which uses the concaved surface to collect the rain, snow and/or dirt and push it in front of the wiper to the bottom edge of the windshield. The side 14, also collects rain, etc.

Figure 7:
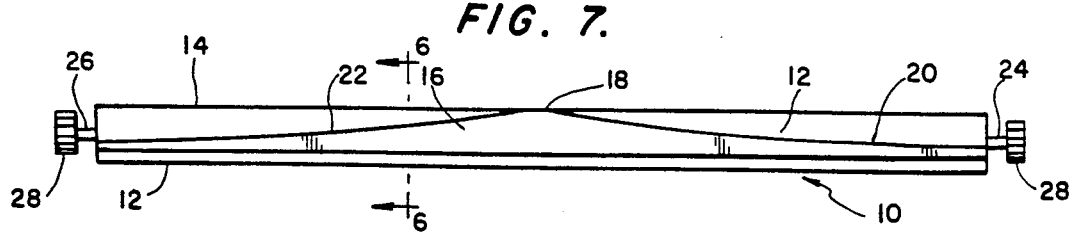
FIG. 7 is a top view of a windshield wiper of the present invention.

To avoid having the rain spill over the upwardly moving wiper 10, the concaved surface 14 is slanted forming a gutter, beat shown by the top view in FIG. 7. The view shown in FIG. 7 shows a top edge 16 in the shape of a delta. The apex 18 is at the center of the wiper 10 and sides 20 and 22 extend to the ends of the wiper, therefore as the wiper 10 moves upward and rain, etc. is pushed to one side or the other of the apex 18 and along either side 20 or 22 to the wiper edge.

FIG. 7 shows a pair of shafts 24 and 26 with gears 28 on the ends of the wiper lo. Each shaft 24 and 26 is molded into the wiper. The wiper 10 is made of a flexible, stretchable material such as plastic or rubber. A feature of the shafts 24 and 26 is that the shafts will not pull out of the wiper.

Figure 6:
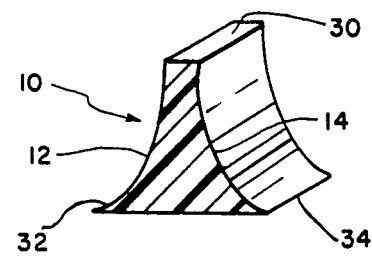
FIG. 6 is a cross sectional view of a windshield wiper of the present invention taken along the line 5—5 of FIG. 2.

The cross section shown in FIG. 5 is taken near one end of the wiper 10. FIG. 6 shows a cross section closer to the center of the wiper where the top surface 30 is wider. It can be seen in FIGS. 5 and 6 that each side 12 and 14 has scrapers or blade edges 32 and 34. Pressure from stretching the wiper 10 across a windshield W causes the scrapers 32 and 34 to closely follow the surface of the windshield for better cleaning.

In use the windshield wiper 10, having been stretched between a pair of synchronized drive means 36 and 38 on the side edges of the windshield W, best shown in FIG. 1, reciprocates vertically over the surface of the windshield. Due to the shape of the wiper 10, rain etc. is pushed ahead of the viper regardless of which direction the wiper is moving. On the downward stroke the concave surface 12 pushes the water, etc. down the windshield. The upward stroke causes the water, etc. to follow along the concave slanted gutters 14 to the side edges of the windshield W.

There are several types of drive means that can be used to operate the wiper. Two typical mechanical drives which can be used are a gear system, FIGS. 2 and 3, a pulley system FIG. 4 or a combination gear and pulley system. Other drive means may include hydraulic and pneumatic means.

Figure 2:
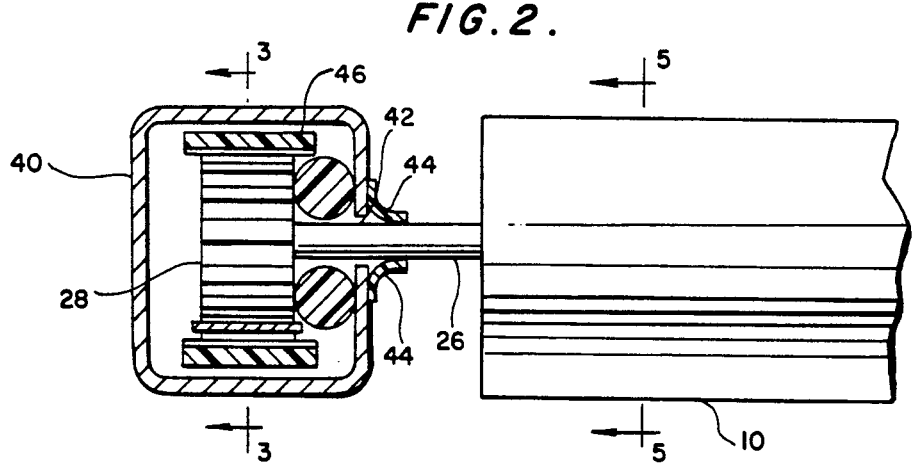
FIG. 2 shows a partial cross sectional view of a drive system for a windshield wiper of the present invention.
Figure 3:
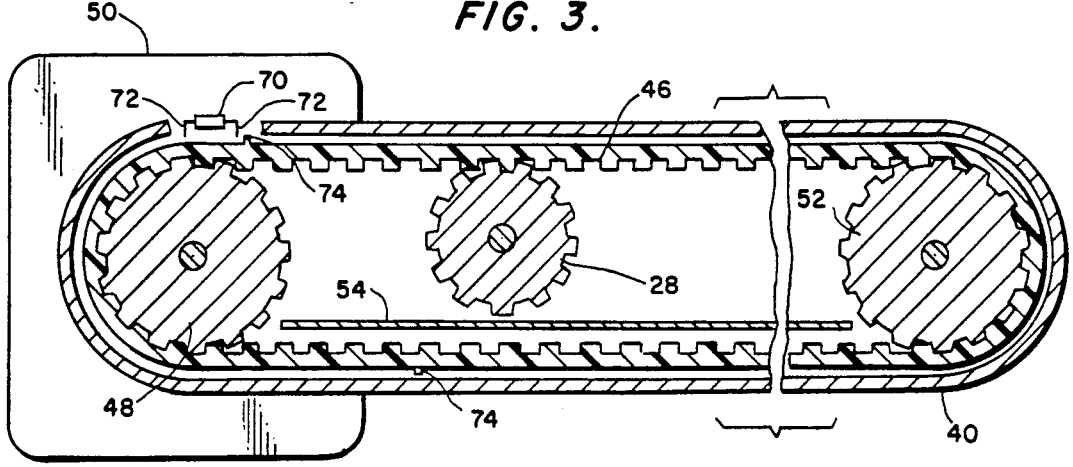
FIG. 3 is a cross sectional view of the drive system of FIG. 2 taken along the line 3—3.

FIGS. 2 and 3 show a gear system for operating the windshield wiper 10. There is a pair of housings 40, one on each side of the windshield W. the housings 40 are identical having a slot 42 for shafts 26 and 28 to extend into housing 40. To protect the gears inside housing 40, an overlapping dust and water cover 44 is affixed over slot 42. Inside the housing 40, gear 28 on the shaft 26 meshes with the gear teeth of the gear belt 46. There is a drive gear 48 connected to a motor 50 and a drive gear 52. The gear belt 46 runs between gears 46 and 48. Shaft gear 28 engages the top half of belt 46 to drive the wiper in first one direction and then the other, reversing when it reaches the end. The motor 50 is of the reversing type such that control switches near the ends of the housing reverse the direction of the motor. A plate 54 keeps the gear 28 from coming in contact with the lower half of gear belt 46.

Figure 4:
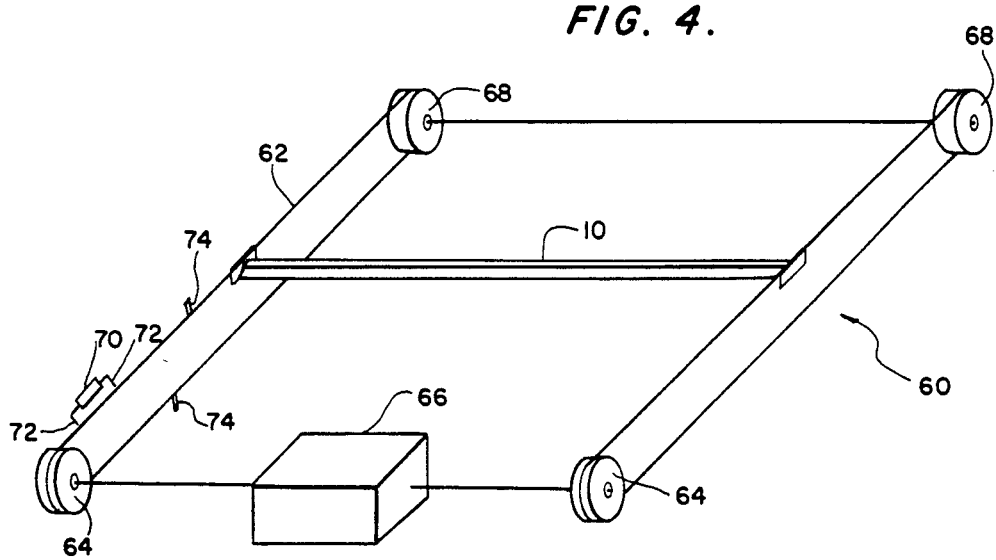
FIG. 4 is a schematic of a pulley drive system for a windshield wiper o the present invention.

Another type of drive system that can be used with the windshield wiper 10 of the invention is the pulley system 60 of FIG. 4. The wiper 10 is connected via its shafts 26 to a driven belt or chain 62. The belts 62 are in a housing similar to housings 36 and 38. Within the housings, toothed pulleys 64 are driven by a reversing motor 66. At the other end of the housing toothed pulleys 68 are driven by the belts 62. Belts 62 are made of chain metal or a plastic with slots to receive the teeth of pulleys 64 and 68. Contact switches 70, reverse the motor 66 and consequently the direction of the wiper 10.

Contact switches 70 are positioned above the gears 46 and 48 of FIG. 3, and pulleys 64 and 68 of FIG. 4. Each contact switch 70 has a lever 72 which extends into the path of a trip means 74, attached to gear belt 46 in FIG. 4, and a pair of trip means 74 attached to a driven belt or chain 62 in FIG. 4. When the wiper 10 reaches the end of its travel or cycle, either up or down, the trip means 74 contacts lever 72 on contact or microswitch 70 which signals motor 66 to reverse direction.

Figure 8:
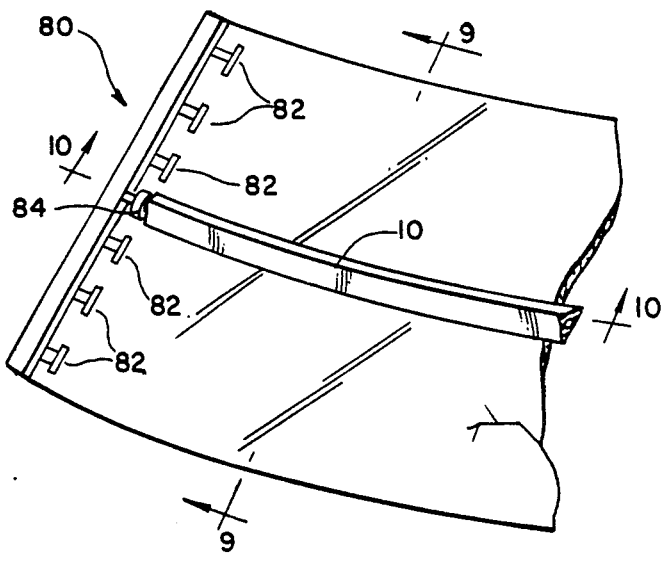
FIG. 8 is a perspective view of another embodiment of a windshield wiper of the present invention.
Figure 9:
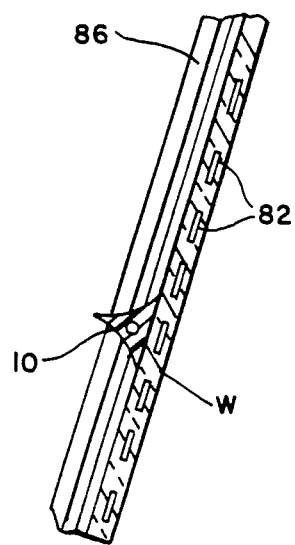
FIG. 9 is a cross sectional view taken along the line 9—9 of FIG. 8.

Alternatively, and preferred, an electromagnetic drive 80 of FIG. 8 reciprocates the windshield wiper 10. Either embedded in windshield W or taped to it are a series of electromagnets 82 wired to a source of electrical energy. Using a synochronous type switching to shut off one electromagnet 82 and turning on the next, the wiper 10 cycles up and down the windshield W. In order for the wiper 10 to move, a pair of magnets 84, one on either end of the wiper 10, are attracted by the energized electromagnets 82 to provide continuous up and down movement. FIG. 9 shows a cross section of windshield W and the embedded electromagnets 82.

Figure 10:
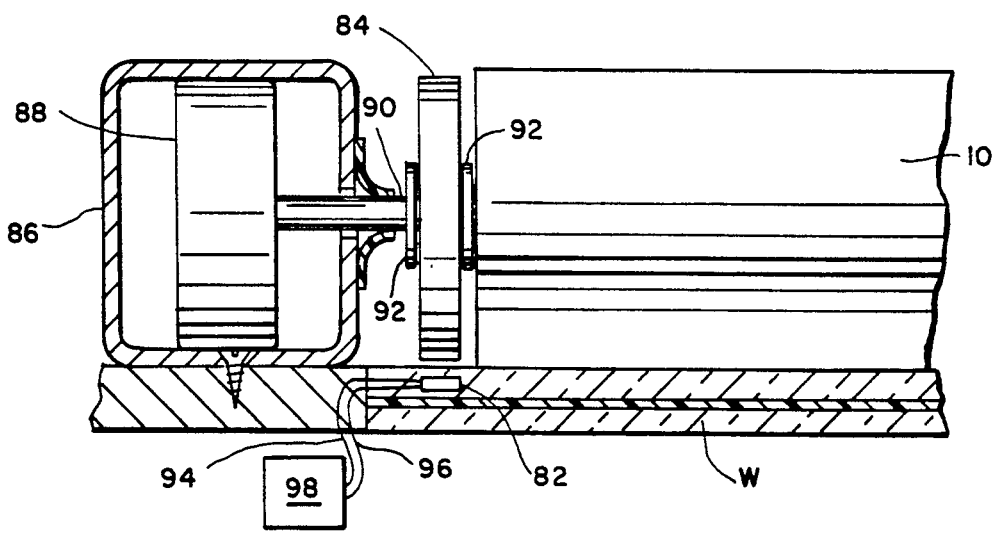
FIG. 10 is a cross sectional view taken along the line 10—10 of FIG. 8.

In FIG. 10 a housing 86, fastened to the windshield frame supports the wiper 10. Each end of the wiper has a guide wheel 88 and a shaft 90. Mounted on shaft 90 is a magnet 84, with a pair of fixed flat washers 92 to keep the magnet in place. A pair of electrical leads 94 and 96 connect the electromagnets 84 to a switching/electrical generator 98. The switching/electrical generator 98 is connected by the electrical leads, only two shown, to each of the electromagnets 84. In actual practice there will be leads 94 and 96 from each electromagnet 82 to the switching/electrical generator 98.

Figure 11:
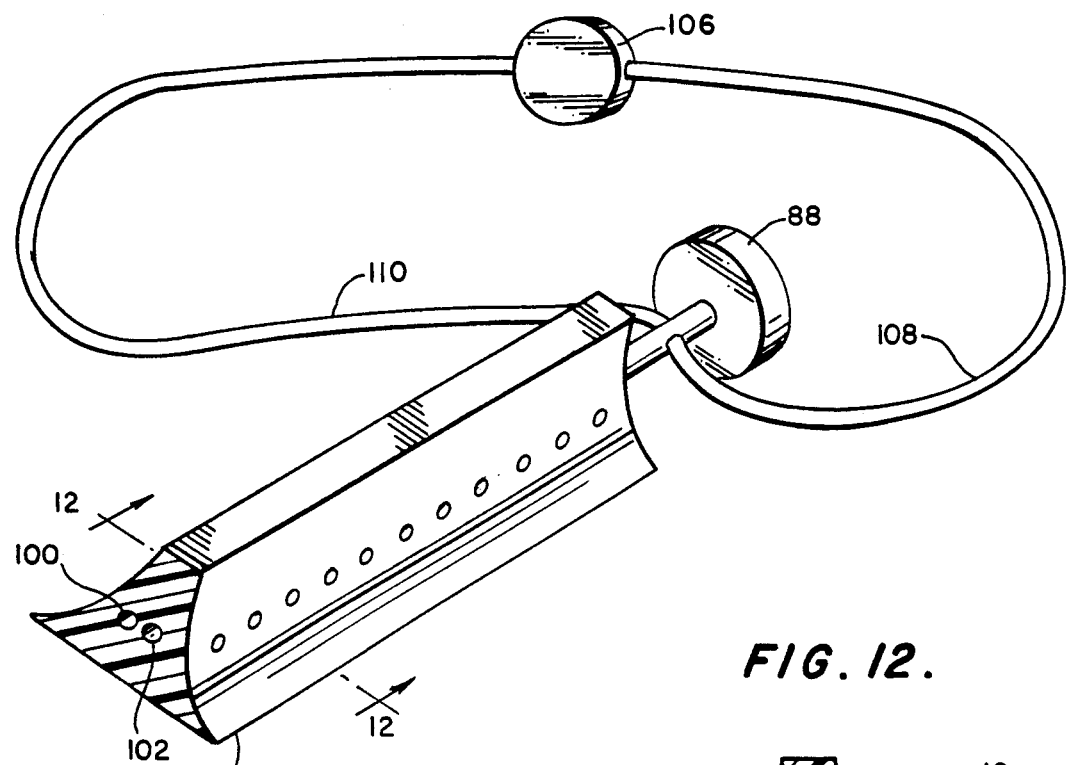
FIG. 11 is a perspective view of a windshield wiper of the present invention showing a windshield washer system.
Figure 12:
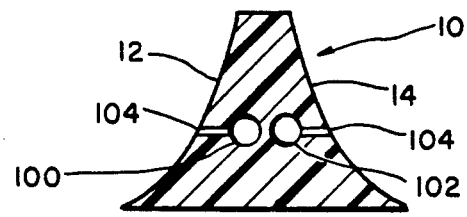
FIG. 12 is a cross sectional view of a windshield wiper taken along the line 12—12 of FIG. 11.
Figure 13:
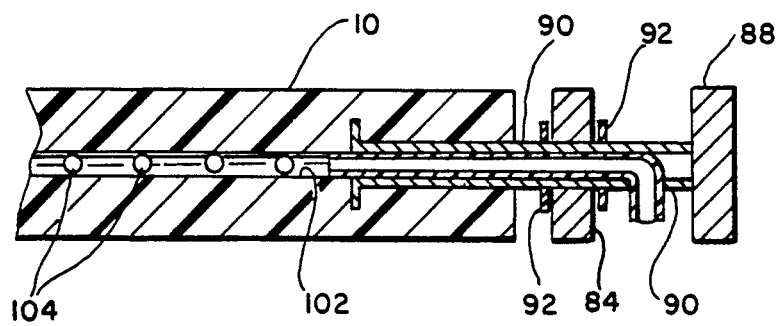
FIG. 13 is a cross sectional view of a windshield wiper taken along the line 13—13 of FIG. 11.

Often there is dirt and oil splashed on a windshield W and when this happens a windshield washer is used in conjunction with a wiper blade. Since the present wiper moves vertically, the washer spray must be sprayed in front of the moving wiper 10. In FIGS. 11 and 12, the wiper 10 has a pair of water tubes 100 and 102. Extending through the wiper 10 on either face 12 and 14 are a plurality of orifices 104, connected to the tubes 100 and 102. At the end extending from the wiper (FIG. 13) the tubings 100 and 102 connect to a water pump and valve 106 by tubing 108 and 110. When the windshield washer reaches one end of the cycle, the contact switch not only reverses the wiper 10 direction, it also moves the valve to close one tubing, either 100 or 102, and opens the other. There is a cut off switch, not shown, to shut off the washer. In the case of the electromagnetic drive 80, the washer system is controlled by the switching-/electrical generator 98.

The sensors 11 are activated by moisture and connected to the electrical controls of the wipers so that when the ignition is on, and rain, even slight will activate the moisture sensors, close a circuit, and cause the wipers to be automatically turned on.

While only one embodiment of the invention has been shown it is understood that one skilled in the art may realize other embodiments after reviewing the disclosure; therefore one should review the drawings, disclosure and claims for a full understanding of the invention.

I claim:

1. A windshield wiper for a motor vehicle windshield where the wiper moves up and down the surface of a windshield to remove rain, snow and other matter from the windshield, comprising:

a windshield wiper extending horizontally across a windshield;

said windshield wiper having a first blade side and a second blade side for contacting the surface of the windshield and removing rain, snow and other matter;

said first blade side being concaved to collect rain, snow and other matter in front of said wiper on a downward movement cleaning the windshield surface;

said second blade side being concaved and slanted from midway of said wiper toward each end of said wiper to direct rain, snow and other matter to the side edges of the windshield without spilling said rain, snow and other matter on to the cleaned surface of the windshield on the upward movement of the wiper cleaning the windshield surface;

said wiper being stretched across the surface of the windshield for close contact with the windshield, and, means to reciprocate said windshield wiper up and down the windshield to remove rain, snow and other matter.

2. A windshield wiper as in claim 1 wherein said windshield wiper is an elastic material for stretching across the windshield, said windshield wiper having two ends with shafts molded therein, said shafts connect to said means for reciprocating said windshield wiper, and said means being connected to the side edges of the windshield.

3. A windshield wiper as in claim 2 wherein said wiper has said first side blade and said second side blade, a top side and a bottom side where said bottom side is wider than said top side, and said top side being wider midway between the ends of said wiper than at the ends of said wiper to give said top surface a delta shape facing in the direction of said second side blade to form a slant means for directing rain, snow and other matter to the edges of the windshield.

4. A windshield wiper as in claim 1 in which said wiper is automatically activated by moisture when the ignition of the motor vehicle is turned on.

5. A windshield wiper as in claim 3 wherein said wiper is moved vertically up and down the windshield by an electromagnetic drive means.

6. A windshield wiper as in claim 4 wherein said electromagnetic drive means has a plurality of electromagnetic means embedded in the windshield, a magnetic means on the ends of said wiper, and a switching-/electrical generator means wherein said magnetic means is moved by switching on and off said electromagnetic means using said switching/electrical generator means.

7. A windshield wiper as in claim 5 wherein said electromagnetic drive means has a plurality of electromagnetic means taped to the windshield, a magnetic means on the ends of said wiper, and a switching/electrical generator means wherein said magnetic means is moved by switching on and off said electromagnetic means using said switching/electrical generator means.

8. A windshield wiper as in claim 2 wherein said wiper includes a windshield washer means having means to spray cleaning fluid in front of the moving wiper, and means to control the direction of spraying.

* * * * *